United States Patent [19]
Merrick

[11] 3,964,273
[45] June 22, 1976

[54] COMPACT ABSORPTION REFRIGERATION APPARATUS

[75] Inventor: Richard H. Merrick, Evansville, Ind.

[73] Assignee: Arkla Industries, Inc., Evansville, Ind.

[22] Filed: Feb. 13, 1975

[21] Appl. No.: 549,805

[52] U.S. Cl. .................................. 62/476; 62/485
[51] Int. Cl.² ........................................... F25B 15/06
[58] Field of Search ............................. 62/476, 485

[56] References Cited
UNITED STATES PATENTS

| | | | |
|---|---|---|---|
| 3,575,012 | 4/1971 | Peckham | 62/476 |
| 3,605,436 | 9/1971 | Gammill, Jr. | 62/476 |
| 3,721,109 | 3/1973 | Porter | 62/476 |
| 3,828,575 | 8/1974 | Malcosky et al. | 62/476 |

*Primary Examiner*—Lloyd L. King
*Attorney, Agent, or Firm*—Cushman, Darby & Cushman

[57] ABSTRACT

An absorption refrigeration apparatus includes an annular absorber-evaporator surrounding a condenser both of which are evaporatively cooled by wetting their exterior surfaces and by flowing a stream of ambient air over the wetted surfaces. The refrigerant vapor generator is disposed within the condenser in a position such that vapor leaving the generator condenses on the inside of the condenser wall and is withdrawn from the bottom of the condenser.

10 Claims, 1 Drawing Figure

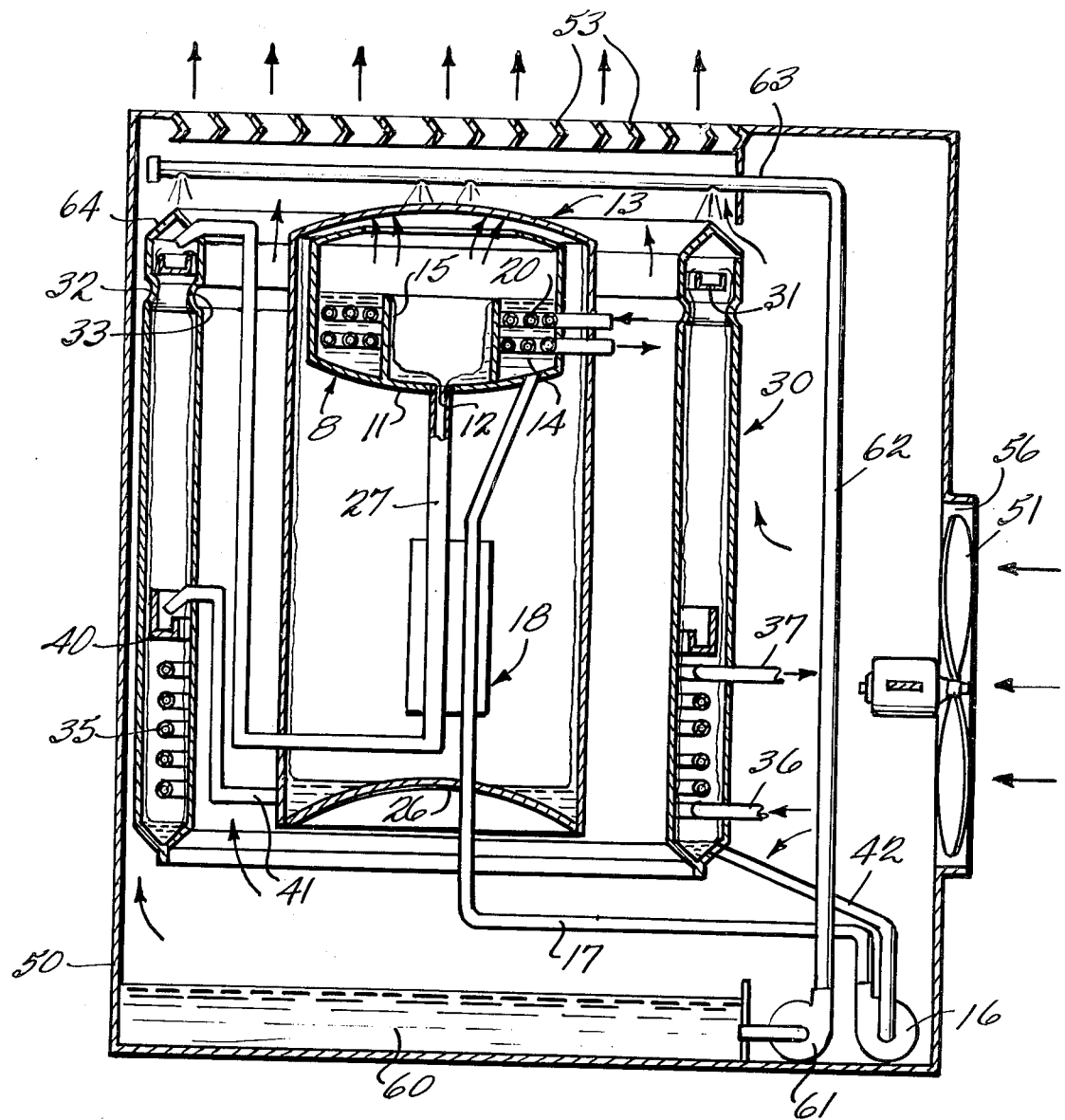

COMPACT ABSORPTION REFRIGERATION APPARATUS

The Government has rights in this invention pursuant to Grant No. GI - 44095 awarded by the National Science Foundation.

This invention relates to absorption refrigeration systems. In particular it relates to improved compact configurations of the absorber, evaporator, generator and condenser. More particularly it relates to a compact system in which the absorber and/or condenser are cooled by direct contact with an evaporating liquid.

BACKGROUND AND SUMMARY

It is conventional to provide a source of recycled cooling water for cooling the absorber and condenser in an absorption refrigeration system. Typically the cooling water flows through coils or other heat exchange apparatus associated with the solution in the absorber and with the vapor in the condenser. The relatively warm water must itself then be cooled, and conventionally this is accomplished by means of a cooling tower where heat is rejected to the atmoshphere during evaporation of a part of the water. The present invention provides a system in which the absorber or condenser and preferably both are cooled by direct contact with evaporating liquid, thereby eliminating the cooling tower and its connections to the system. This results in a savings in space requirements and in installation costs.

A further feature of the invention, which also reduces space requirements, is an improved arrangement in which the absorber is constructed of annular shape and in which the generator and condenser are located centrally within the annular absorber. This arrangement is particularly compatible with the abovedescribed arrangement in which the external surfaces of the absorber and condenser are cooled by contact with evaporating liquid.

The above features can be obtained by a system in which the components are arranged in a common housing through which a stream of ambient air is passed by a fan or the like and in which a stream of water is directed onto the surfaces of the absorber and condenser so as to form a film of evaporating water on these surfaces. The water vapor passes out of the housing with the air stream and the unevaporated water is collected and recycled to the surfaces to be cooled. The absorber is preferably an annular vessel disposed with its axis vertical and surrounding the other components. In operation solution weak in refrigerant flows down the inner surface of the annular vessel while absorbing refrigerant vapor being passed into the vessel and while being cooled by heat exchange with the evaporating liquid film on the outside of the vessel.

The condenser is preferably a closed shell over which the evaporating cooling liquid flows. The generator is preferably a smaller vessel located within the upper portion of the condenser and constructed to expel refrigerant vapor into contact with the inner surface of the wall of the condenser so that condensed refrigerant flows down this surface to the lower portion of the condenser. The heat source for the generator may be a stream of hot fluid, such as steam or hot water, passing in heat exchange relationship with the solution in the generator.

DESCRIPTION OF EXEMPLARY EMBODIMENT

The invention will be further understood from the following description of an exemplary embodiment taken with the drawing which is a schematic vertical sectional view of an absorption refrigeration system embodying the principles of the present invention.

A generator 8 for receiving the solution to be boiled includes a circular bowl-shaped vessel having a side wall 10 and a bottom 11 which is provided with a centrally disposed outlet 12. The generator 8 is enclosed within the upper end of a condenser 13 which is a vertically disposed cylindrical vessel. Solution to be boiled in the generator 8 is pumped into an annular partitioned section 14 defined by a circular wall 15 which is disposed within the circular bowl and which has a height somewhat less than that of the side wall 10. The solution is received under the necessary pressure from a pump 16 by way of a conduit 17 and a heat exchanger 18 that is also enclosed within the condenser 13. The solution flows from the heat exchanger 18 to the annular space 14 in the generator to be heated to boil off refrigerant vapor. For this purpose, a spirally disposed heater 20 is submerged in the solution pumped into the annular space 14, and the refrigerant is boiled off from the solution under the pressure prevailing in the condenser 13. As illustrated the heater 20 is a tubular coil which receives a recirculated stream of hot fluid such as steam or hot water from a source (not shown). Other forms of heaters may also be used. Refrigerant vapor expelled from the solution passes out of the open upper end of the generator 8 into immediate contact with the cool inner surface of the top of the condenser 13.

The condenser 13 is preferably a vertically disposed cylindrical vessel having an upwardly convex top, a cylindrical side wall 25 and a bottom wall 26. Refrigerant vapor from the generator 8 condenses on the cool side wall 25 and flows downwardly to be collected in the bottom of the condenser 13.

The hot solution that has been stripped of refrigerant vapor by the heater 20 overflows the top edge of the wall 15 in the generator 8 to flow to the bottom thereof and into the outlet 12 to escape from the generator 8 and flow through an outlet conduit 27 to the heat exchanger 18. Most of the heat in the overflowing solution is transferred to the inflowing solution being pumped to the generator 8 through the infeed conduit 17 so that the stripped solution is cooled and the solution rich in refrigerant is preheated as it flows to the generator 8.

An annularly shaped absorber-evaporator vessel 30 surrounds the condenser 13 which conveniently is disposed along the vertical axis of the vessel 30. The top of the absorber-evaporator 30 is situated at about the same level as the top of the condenser 13. Partially cooled stripped solution flowing from the heat exchanger 18 is delivered by the conduit 27 into a solution-receiving annular channel 31 supported within the upper end of the absorber-evaporator vessel 30. The channel 31 has a width that is almost as wide as the inside dimension of the absorber-evaporator 30. Just below the channel 31, the side walls of the vessel 30 have inward projections 32 and 33, formed therein, that extend under the channel 31, so that the solution overflowing from channel 31, flows on to these projections and follows their surfaces to flow downwardly over the inside surfaces of the side walls of the vessel 30.

Within the evaporator portion at the lower end of the absorber-evaporator vessel 30 is disposed a coil 35 for circulating a fluid such as water to be cooled. Suitable connections including inlet 36 and outlet 37 and circulating means hot shown are provided to deliver the fluid to be cooled, through coil 35.

A second annular channel 40 is supported inside the annular vessel 30 just above the coil 35. The channel 40 receives liquid refrigerant delivered from the bottom of the condenser chamber 13 through a conduit 41. The liquid refrigerant overflows from the channel 40 onto the outer surface of the coil 35 where it vaporizes and removes heat from the fluid passing through the coil 35.

Refrigerant vapor formed in the evaporator portion of the vessel 30 flows upwardly in contact with the downwardly flowing solution on the inside walls of vessel 30. The refrigerant vapor dissolves in the liquid and the resulting solution collects in the bottom of the vessel 30. A conduit 42 connects the bottom of the vessel 30 with the intake to the pump 16 for recycling the enriched solution under pressure to the generator 13.

The entire assembly of generator 10, condenser 13 and the annular absorber-evaporator vessel 30, is enclosed on all sides and the bottom by a casing 50. A fan 51 is located within an air inlet aperture 52 in the side wall of the casing 50, and the top wall of the casing 50 includes an air outlet aperture provided with droplet eliminators 53. A reservoir 60 for holding an evaporative cooling liquid such as water is contained within the casing 50, and a pump 61 is provided for passing the water through a conduit 62 to a spray header 63 located in the upper end of the casing 50. The header 63 has at least one outlet positioned to shower cooling liquid onto the top of the condenser 13 so as to flow down over the outside of the side wall 25 to condense refrigerant vapor inside the condenser 13. The header 63 includes a ring-shaped branch having outlets for spraying cooling liquid onto both sides of the peaked top 64 of the absorber-evaporator vessel 30. The fluid spray thus divided over the peak, flows down all exterior surfaces of the vessel 30 to remove heat from the solution flowing down the inside wall of the absorber portion of the vessel 30. The flow of ambient air over the film of cooling liquid on the vessel 30 and on the condenser 13 causes evaporation of the film.

Any of the conventionally known refrigerant and absorbent combinations used in absorption refrigerating cycles can be used in the system. A suitable composition is an aqueous solution of lithium iodide or lithium bromide or both wherein water is the refrigerant and a concentrated solution of the salt is the absorbent. The pressure in the generator and compressor space serves to drive the stripped solution through conduit 27 from the heat exchanger 18 into the channel 31 in the annular absorber-evaporator 30. Similarly, the liquid refrigerant in the reservoir at the bottom of the condenser 13 is driven up through conduit 41 to flow into channel 40 over the coil 35 by the pressure differential that exists between the generator-condenser space and the space in the vessel 30. The cycle can be designed to operate without any further controls than are needed to cycle the operation of the pump 16 to cause it to withdraw the enriched solution from the annular evaporator-absorber chamber 30 at a rate to maintain the designed pressure differential that must exist between the chambers.

During normal operation the pump 16 delivers the refrigerant rich solution through the heat exchanger 18 into the annular space 14 at a rate such that the desired volume of the refrigerant is boiled out of the solution to be condensed in condenser 13 and collected at the bottom 26 thereof. The liquid refrigerant is then fed to the evaporator portion of the vessel 30 to be vaporized as it flows over the coil 35, the refrigerant vaporizing at a rate to provide the desired rate of B.T.U. removal from the medium flowing in coil 35. The absorber portion of the vessel 30 is operative to cause the refrigerant vapor and solution to come into contact with each other to form an enriched solution and maintain the desired lower pressure within the evaporator portion of the vessel 30 by removing the refrigerant vapor. The solution is removed by pump 16 to continue the cycle. By properly designing the size and volume relationships together with the selection of the combination of refrigerant and solution to be used, an efficient compact concentrically arranged condenser and absorber-evaporator arrangement, is provided. When the apparatus is cooled with the ambient air circulation together with recirculation and partial evaporation of a cooling fluid such as water flowing over the surface of the various chambers of the apparatus, a much more compact, efficient and useful construction results, because it is unnecessary to provide a cooling tower for the cooling water.

While the description above covers the preferred form of the apparatus, it is apparent that modifications may be made without departing from the scope of the invention as defined in the following claims.

What is claimed is:

1. An absorption refrigeration apparatus comprising a vapor generator for vaporizing refrigerant from an absorbent liquid to leave a hot stripped solution, a condenser vessel enclosing said generator to condense the refrigerant vapor, a unitary means including an absorber-evaporator vessel for vaporizing the condensed refrigerant and for contacting the stripped solution with the refrigerant vapor flowing from the evaporator to form an enriched solution, said unitary means surrounding the condenser, conduit means to convey the liquid refrigerant to the evaporator and other conduit means to feed the stripped solution to the absorber-evaporator vessel, and apparatus including a pump for circulating the enriched solution flowing from the absorber-evaporator vessel back to the generator together with means for heating the solution in the generator and means for circulating a medium to be cooled in heat-exchanger relationship with the vaporizing refrigerant in the absorber-evaporator vessel.

2. An apparatus as described in claim 1 having a casing enclosing the condenser vessel and the absorber-evaporator vessel, means to circulate air through said casing and over the vessels, cooling liquid recirculating means including a reservoir for the cooling liquid and pump means connected with conduits to spread the cooling liquid onto the exterior surfaces of the condenser vessel and the absorber-evaporator vessel.

3. An apparatus as described in claim 2 wherein said condenser vessel includes a hollow cylinder and said unitary means is an annular chamber.

4. An apparatus as described in claim 3 wherein said condenser vessel is vertically elongated, said generator being wholly enclosed within the upper portion of said condenser vessel.

5. An apparatus as described in claim 4 wherein a heat exchanger is disposed under said generator in said condenser vessel and wherein said pump for circulating the enriched solution has an outlet connected to said heat exchanger, and means to deliver the hot stripped solution from the outlet of the generator to the heat exchanger before feeding it to the absorber-evaporator vessel.

6. An apparatus as described in claim 4 wherein the axis of said condenser vessel and said annular absorber-evaporator vessel coincide, and the upper ends of the condenser vessel and the absorber-evaporator vessel lie in substantially the same horizontal plane that is disposed at 90° with respect to the vertical axis of the condenser vessel.

7. An apparatus as described in claim 6 wherein said cooling fluid is sprayed onto the top ends of said vessels to flow downwardly over their outer surfaces and wherein said reservoir is disposed under said vessels to collect fluid drop.

8. An absorption refrigeration apparatus comprising an absorber-evaporator vessel; a refrigerant vapor generator including means for heating rich absorbent solution therein; a condenser vessel receiving refrigerant vapor from the vapor generator; an evaporator for vaporizing liquid refrigerant formed in the condenser vessel; an absorber vessel for contacting refrigerant vapor formed in the evaporator with absorbent solution from the vapor generator; means for flowing a film of evaporative cooling liquid over the external surfaces of at least one of the condenser vessels and the absorber vessel, and means for flowing a stream of gas over the flowing film of liquid to cause at least partial vaporization thereof.

9. Apparatus as in claim 8 wherein said generator is disposed inside said condenser vessel.

10. Apparatus as in claim 8 including a casing surrounding the vessel having a film of cooling liquid thereon; said casing having an air inlet and an air outlet, and means for passing a stream of air into the outlet, through the interior of the casing and out through the outlet.

* * * * *